Sept. 16, 1941.   K. E. STUART   2,256,362
PRECISION APPARATUS FOR DIVIDING FLOWING LIQUIDS
INTO DEFINITE PROPORTIONS
Filed Feb. 29, 1940   3 Sheets-Sheet 2
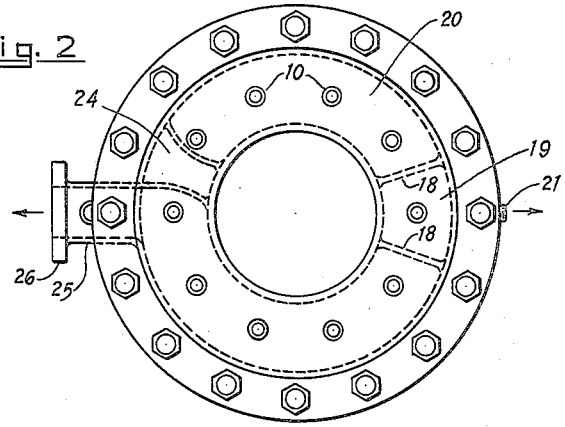
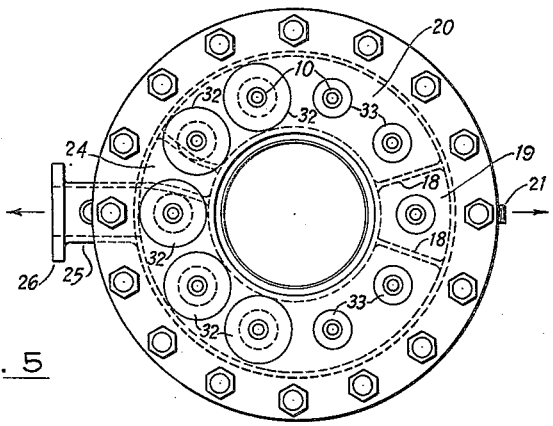
INVENTOR.
Kenneth E Stuart Sept. 16, 1941.  K. E. STUART  2,256,362
PRECISION APPARATUS FOR DIVIDING FLOWING LIQUIDS
INTO DEFINITE PROPORTIONS
Filed Feb. 29, 1940   3 Sheets-Sheet 3

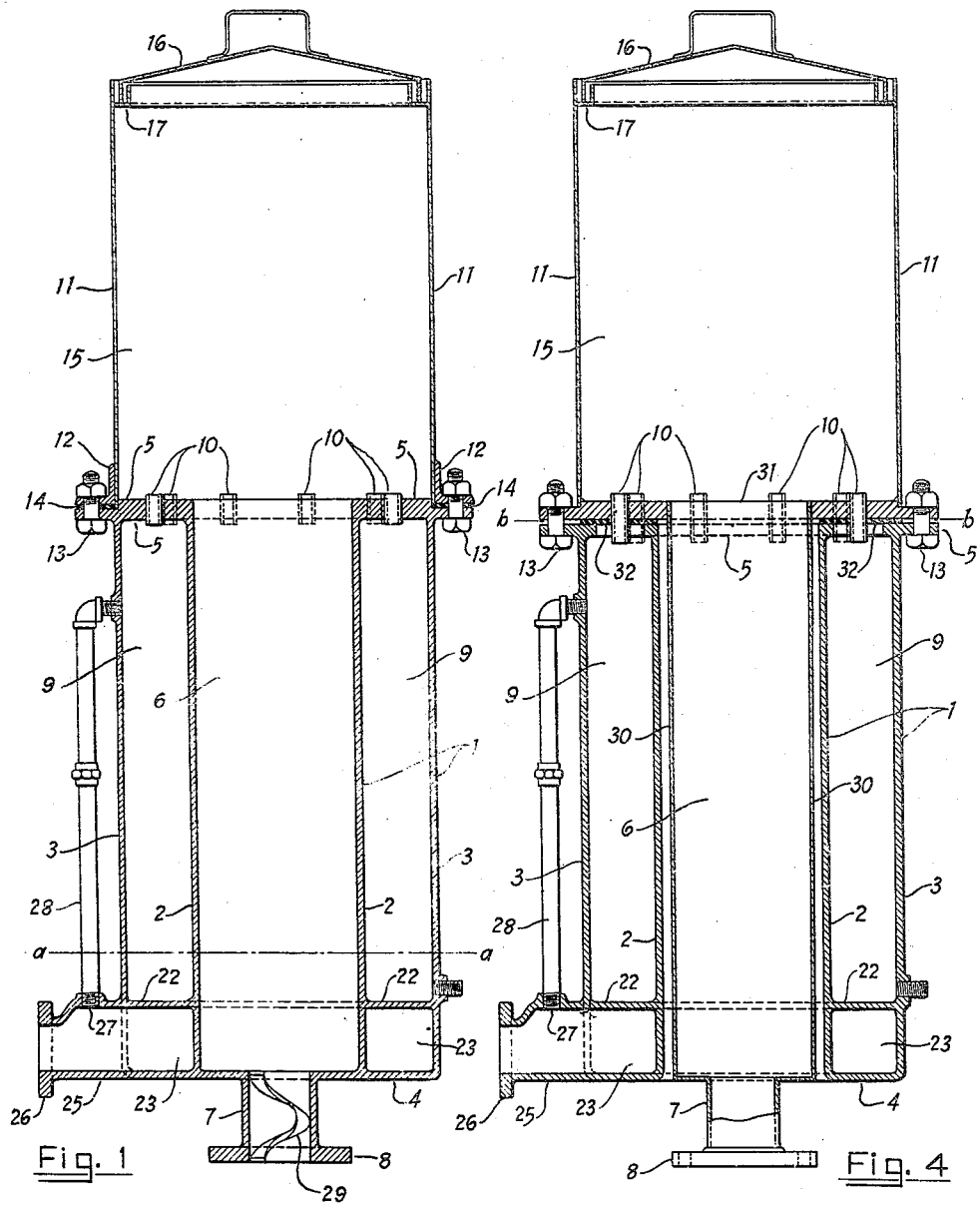

INVENTOR.
Kenneth E. Stuart

Patented Sept. 16, 1941

2,256,362

UNITED STATES PATENT OFFICE 2,256,362

PRECISION APPARATUS FOR DIVIDING FLOWING LIQUIDS INTO DEFINITE PROPORTIONS

Kenneth E. Stuart, Niagara Falls, N. Y., assignor to Hooker Electrochemical Company, Niagara Falls, N. Y., a corporation of New York Application February 29, 1940, Serial No. 321,509

13 Claims. (Cl. 137—166)

By "precision apparatus" is meant one which will divide such a flowing liquid into two or more parts the ratio of which is fixed by the construction of the apparatus with a probable error of the order of one percent or less and may be known to within a tenth of one percent or less by calibration. I am aware that apparatus for dividing flowing liquids into proportionate parts has been described, but so far as I am aware no such apparatus capable of the precision that I have attained has been proposed. To be useful for my purposes such apparatus must not only be accurate but must maintain a high degree of accuracy over a considerable range of flows.

In nearly all chemical industries the product is liquid at some stage. It is very important in such industries to keep an accurate account of the quantity, as well as of the quality, of the liquid product, as a check upon yield and for better control of the process. The volume of liquid product may be very large and its volumetric or more particularly its gravimetric measurement, as well as its accurate sampling, a very expensive matter. An example of a large industry producing great volumes of liquid product is petroleum refining. Another example is electrolytic production of caustic soda. Many other such examples could be given. My apparatus gives a sample that is not only quantitatively but also qualitatively accurate. From such a sample chemical yields can be correctly determined.

One of the most frequent causes of inaccuracy in apparatus heretofore proposed, depending upon dividing the flow of liquid between two or more flow passages, is lack of symmetry. Thus, a flow of liquid may be divided accurately between a large orifice and a small orifice, or between like orifices in an unsymmetrical arrangement, or between like orifices symmetrically arranged in different planes or in two or more concentric circles, provided the flow is constant and the apparatus has been calibrated; but with such an arrangement any change in flow will change the calibration materially.

Other causes of inaccuracy are turbulence in the liquid and entrained air. Thus a stream of liquid falling through the atmosphere upon a body of liquid above a series of orifices will entrain bubbles of air and if any of this passes through the orifices it will render the calibration erratic. Also, such a stream will generally cause great turbulence in the body of liquid above the orifices and subject them to unequal and variable dynamic pressures which are destructive of all accuracy.

For the attainment of the degree of accuracy which I seek it is necessary therefore that a body of the liquid to be measured be maintained above and in communication with a series of like orifices under equal static pressure and also equal dynamic pressure, if any, and that air be excluded and turbulence minimized or equalized. For this purpose it is necessary that the orifices be all on the same level, otherwise the lowermost will be under a higher static pressure than the uppermost. It is necessary that the orifices be equidistantly distributed around a single circle at the center of which the liquid is introduced. It is also desirable that the liquid-retaining wall above and outside the circle of orifices be concentric with the orifices. In Patent No. 1,964,775 granted to me July 3, 1934, there is disclosed an apparatus in which the liquid is introduced at the center of a circle of orifices; but in this case the liquid was introduced from above and the resulting turbulence and air entrainment proved to be very troublesome. My present invention therefore differs from that referred to in that the liquid is introduced from below.

I am aware that apparatus has been proposed in which the liquid is introduced from below and overflows through a series of V shaped notches or weirs cut around the rim of the reservoir. This apparatus is open to the objection that weir notches cannot be cut with as high a degree of precision as circular orifices; also that the head upon such weir notches is of necessity very slight and any inaccuracy in the depth to which the notches are cut or in levelling the apparatus results in a relatively enormous error, particularly as change in head upon a V shaped notch is accompanied by a change in cross-sectional area. I therefore prefer to use circular orifices, not only because they can be cut with extreme accuracy, but also because they can be accurately levelled and operated under such a substantial head that such variations in level as are unavoidable with modern precision gauges become negligible in comparison with the head on all the orifices. One way in which I secure accuracy in diameter of the orifices is to make them tubular and cut them from a single piece of tube, so that all are of identical diameter.

Referring to the drawings:

Figure 1 is an elevation of one form of my apparatus, largely in section.

Figure 2 is a plan view of the apparatus of Figure 1 with the upper or reservoir member removed.

Figure 4 is an elevation of another form of my apparatus, mostly in section.

Figure 5 is a plan view in section through the orifices along the line b—b of Figure 4.

Figure 3:
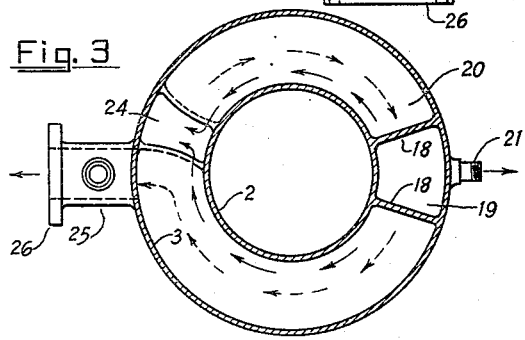
Figure 3 is a plan view in section along the line a—a of Figure 1.

Referring to Figures 1 to 3:

1 is a receptacle formed with the inner and outer walls 2, 3, bottom 4 and top 5 which may be cast integrally as shown in the drawings. The inner wall 2 is cylindrical. The outer wall 3 is likewise preferably cylindrical. The inner wall 2 forms a conduit 6, the axis of which must be vertical, passing through the receptacle from bottom to top. The upper end of conduit 6 is open. The lower end is adapted to be connected to a source of the liquid to be measured (not shown) through pipe 7, which should be coaxial with conduit 6 and of considerably smaller diameter and which may be provided with flange 8 to facilitate coupling with the pipe (not shown) leading from said source.

Between walls 2 and 3 is formed an annular chamber 9 closed at bottom and top by walls 4 and 5 respectively. Wall 5 forms a flat horizontal flange with respect to conduit 6. Flange 5 is pierced by a series of like equidistant orifices 10 arranged around a circle concentric with the open circular mouth of conduit 6. Upon flange 5 is mounted a liquid tight preferably cylindrical retaining wall 11 encompassing said orifices and concentric with the circular mouth of conduit 6. Retaining wall 11 is secured to flange 5 by means of angle 12 and bolts 13, the joint being rendered liquid tight by packing 14. Retaining wall 11 forms with flange 5 a reservoir 15 into which conduit 6 discharges. Reservoir 15 may be closed by cover 16 which may be provided with water seal 17.

Orifices 10 may be of any convenient number such as ten and are preferably formed by short sections of tube inserted through holes drilled in flange 5. Orifices 10 must be spaced equidistantly on a circle exactly concentric with the open mouth of conduit 6 and pressed through the holes in flange 5 to exactly the same distance, so that the ends of these orifices all lie in the same horizontal plane. Orifices 10 are positioned to discharge into the annular chamber 9, preferably midway between the walls 2 and 3.

Chamber 9 is divided by vertical partitions 18, 18 which preferably extend radially between inner and outer walls 2, 3, and are preferably located in plan midway between two orifices each side of a single orifice, so as to form a separate liquid tight compartment 19, into which a single orifice discharges and another large compartment 20 into which all the other orifices discharge. Partition 18 does not extend all the way up to flange 5, but leaves an open space at the top of compartment 19 communicating with compartment 20 for equalization of pressure.

The liquid collected in compartment 19, representing exactly one tenth of the liquid entering through pipe 7, is carried away through pipe 21, either to be weighed or measured or to be passed through another similar apparatus to be subdivided again into ten equal parts, each one representing exactly one percent of the original flow.

Chamber 9 is provided with a horizontal partition 22 near its bottom, separating off compartment 23. The liquid from the nine orifices discharging into compartment 20 flows in opposite directions as indicated by the full line arrows to opening 24, through which it enters compartment 23. In compartment 23 it flows clockwise, as indicated by the dotted arrows, to discharge pipe 25, which is provided with flange 26. The object of compartment 23 is as follows: The liquid flowing from the orifices necessarily spreads more or less and entrains air. This would tend to create a reduced pressure in chamber 9. Although this would affect all the orifices alike it might reduce the head of liquid upon them to an extent which would affect the accuracy of the apparatus. Therefore the discharge from the orifices is collected in compartment 23 and carried around its circumference to allow sufficient time for the bubbles of air to rise to the surface before the liquid is carried away through pipe 25. Just before the liquid enters pipe 25 it passes the mouth 27 of a vent pipe 28, through which the entrained air is conveyed back to chamber 9. Chamber 9 could of course be protected against the building up of a reduced pressure within it by merely connecting it to the atmosphere; but in that case if the liquid to be measured were a solution of a salt, the indraft of air would cause objectionable encrustations.

The apparatus should be proportioned to the quantity of liquid it is to measure so that the velocity of the liquid entering pipe 7 will be between 1 and 5 feet per second.

In operation, when the full flow of liquid to be measured is admitted to pipe 7 it rises up through conduit 6 into reservoir 15, automatically establishing a head upon orifices 10 sufficient to carry away liquid through them as fast as it enters reservoir 15.

It will be noted that the orifices are very accessible from above and may be swabbed out with great facility by simply lifting cover 16.

The diameter of conduit 6 should preferably be between 2 and 3 times that of pipe 7, so that the velocity of the liquid rising in conduit 6 can never be sufficient to cause turbulent flow in this conduit. The length of conduit 6 should preferably be 3 to 4 times its diameter to allow time for any turbulence at the entry to subside.

It will be observed that the direction of exit of the liquid from reservoir 15 is opposite to that of its entry, so that the kinetic energy of the entering liquid cannot increase the static pressure upon the orifices. Nevertheless it is desirable to impart a gentle rotary motion to the column of liquid rising in conduit 6. This may be accomplished by building into pipe 7 a short section of helix 29. The diameter of shell 11 should be between 2 and 2½ times the diameter of conduit 6.

The diameter of the orifices 10 and height of reservoir 15 should be designed to carry away the liquid as fast as it can enter pipe 7 at the maximum flow for which the apparatus is designed within the limits of velocity set forth above.

When proportioned as just stated, the maximum velocity of the liquid in conduit 6 will be well below the settling velocity of the ordinary kinds of foreign matter liable to be found in liquids to be measured, such as most salts in granular form in their water solutions, of which common salt in brine is an example. This velocity will of course be well below the settling velocity of iron scale in such liquids as gasoline, electrolytic caustic soda solutions, etc. Therefore for many purposes receptacle 1 can be made of cast iron or brass which are the commonest and cheapest of castable metals. However, the orifices themselves and the wall 11 and cover 16 of reservoir 15 which are located above the orifices should not be made of any metal that can possibly form scale. These parts may be of brass or copper; but I find that Monel metal is very well suited to the purpose and to be preferred for many uses on account of its high chemical resistance.

In Figures 4 and 5 there is illustrated a modification of my apparatus in which conduit 6 is formed by a separate shell 30 inside wall 2 and welded to its own flange 31 which in turn is welded to wall 11. The purpose of this is to enable the entire assembly comprising conduit 6, flange 31 and reservoir 15 to be constructed of corrosion resisting metal, such as Monel. In this case the flange 8 must be no larger in diameter than shell 30, so that it can be drawn out through wall 2. The orifices 10 may be inserted in either flange 5 or flange 31, but are preferably in the latter. The joint between flanges 5 and 31 is rendered liquid tight by packing 32, which is preferably in the form of separate washers surrounding each orifice. This is better illustrated in Figure 5. The orifices project through enlarged openings 33 in flange 5, which is also illustrated in Figure 5.

Figure 6:
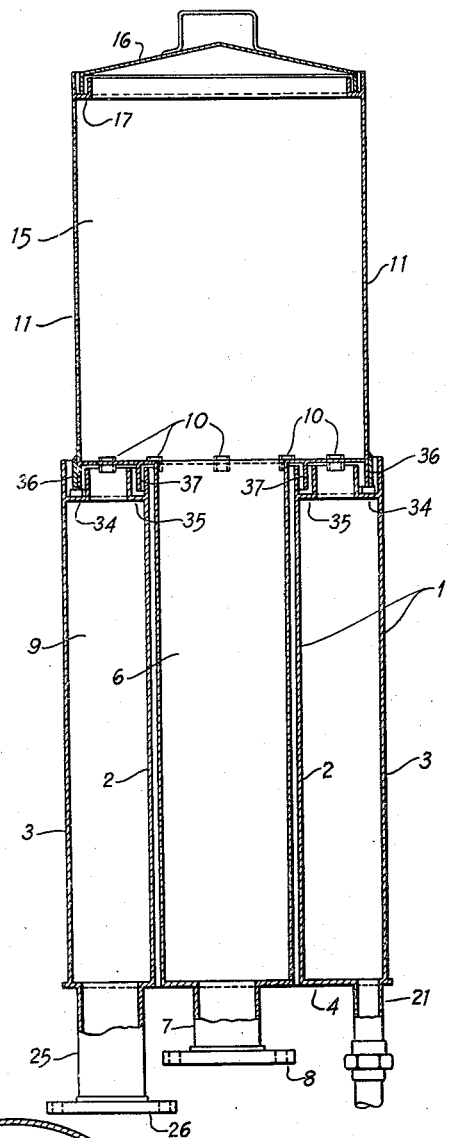
Figure 6 is an elevation of another form of my apparatus, mostly in section.

Another modification of my apparatus is illustrated in Figure 6. In this case flange 5 is replaced by inner and outer water seals 34 and 35, with which rims 36 and 37, which are added for the purpose to flange 31 and to wall 11 respectively, co-operate in well known manner. The particular purpose of the alternative of Figure 6 is to enable the entire apparatus to be constructed of sheet metal, such as steel, copper or Monel, thus avoiding castings altogether. In this case the discharge pipes 21 and 25 are connected vertically to bottom wall 4.

In the following claims the term "orifice" is used in its technical sense, in which it denotes an opening or passage formed with precision in a plate and adapted for measurement of fluid flow, as in orifice meters.

I claim as my invention:

1. A precision apparatus for dividing a flowing liquid into definite proportions comprising a conduit adapted to be connected at its lower end to a source of said liquid and terminating vertically in a flanged open mouth; a series of orifices extending through said flange equidistantly spaced around a circle concentric with said mouth, said orifices being similar as to form and equal as to dimensions and having their inlets lying in the same horizontal plane; a liquid tight retaining wall upon said flange encompassing said orifices and concentric with said circle, forming with said flange a reservoir into which the conduit discharges; means for collecting the liquid flowing through at least one of said orifices; and means for collecting the liquid flowing through the other orifices.

2. An apparatus as claimed in claim 1 in which said conduit is cylindrical.

3. An apparatus as claimed in claim 1 in which said conduit is cylindrical and of substantially greater diameter than the pipe by which it is connected to said source of liquid.

4. An apparatus as claimed in claim 1 in which said reservoir-forming retaining wall is cylindrical.

5. An apparatus as claimed in claim 1 in which said orifices are circular.

6. An apparatus as claimed in claim 1 in which said orifices are tubular and parallel.

7. An apparatus as claimed in claim 1 in combination with means for imparting a rotary motion to the column of liquid rising in said conduit.

8. An apparatus as claimed in claim 1 in which said conduit is cylindrical and its diameter between 2 and 3 times that of the pipes connecting it to said source of liquid and its length between 3 and 4 times its diameter.

9. An apparatus as claimed in claim 1 in which the diameter of said reservoir-forming retaining wall at its lower edge is between 2 and 2½ times that of said conduit.

10. A precision apparatus for dividing a flowing liquid into definite proportions comprising a conduit adapted to be connected at its lower end to a source of said liquid and terminating vertically in a flanged open mouth; a series of orifices extending through said flange equidistantly spaced around a circle concentric with said mouth, said orifices being similar as to form, and equal as to dimensions and having their inlets lying in the same horizontal plane; a liquid tight retaining wall upon said flange encompassing said orifices and concentric with said circle, forming with said flange a reservoir into which the conduit discharges; a receiver surrounding said conduit and arranged to receive the liquid flowing through said orifices; and vertical partitions dividing said receiver into compartments arranged to receive the liquid flowing through specific orifices.

11. A precision apparatus for dividing a flowing liquid into definite proportions comprising a receptacle having inner, outer, bottom and top walls, said inner wall defining a vertical conduit adapted to be connected at its lower end to a source of said liquid and terminating in an open mouth around which said top wall forms a flange; a series of orifices extending through said flange equidistantly spaced around a circle concentric with said mouth, said orifices being similar as to form and equal as to dimensions and having their inlets lying in the same horizontal plane; a liquid tight retaining wall upon said flange encircling said orifices and concentric with said circle, forming with said flange a reservoir into which said conduit discharges; and vertical partitions in said receptacle extending from its inner to its outer wall and dividing it into compartments arranged to receive the liquid flowing from specific orifices.

12. An apparatus as claimed in claim 11 in which said inner, outer, bottom and top walls are integral.

13. A precision apparatus for dividing a flowing liquid into definite proportions comprising a conduit adapted to be connected at its lower end to a source of said liquid and terminating vertically in a flanged open mouth; a series of orifices extending through said flange equidistantly spaced around a circle concentric with said mouth, said orifices being similar as to form and equal as to dimensions and having their inlets in the same horizontal plane; a liquid tight retaining wall upon said flange encompassing said orifices and concentric with said circle, forming with said flange a reservoir into which said conduit discharges; a receiver surrounding said conduit and adapted to receive liquid flowing through said orifices; vertical partitions dividing said receiver into compartments, one of them arranged to receive liquid flowing through a major group of orifices; an exit from said compartment to a channel formed in the lower part of said receiver; an air pocket in the upper part of said channel; and a vent pipe connecting said pocket to a point near the upper part of said receiver.

KENNETH E. STUART.